(12) United States Patent
Albert (10) Patent No.: US 8,916,832 B1
(45) Date of Patent: Dec. 23, 2014

(54) METHOD AND DEVICE FOR DETECTING MOVING RADIATION SOURCES

(71) Applicant: U.S. Department of Homeland Security, Washington, DC (US)

(72) Inventor: Thomas E. Albert, Ozona, FL (US)

(73) Assignee: The United States of America, as Represented by the Secretary, Department of Homeland Security, Washington, DC (US)

( * ) Notice: Subject to any disclaimer, the term of this patent is extended or adjusted under 35 U.S.C. 154(b) by 0 days.

(21) Appl. No.: 13/972,170

(22) Filed: Aug. 21, 2013

(51) Int. Cl.
*G01T 1/16* (2006.01)
*G01T 1/167* (2006.01)

(52) U.S. Cl.
CPC .................... *G01T 1/167* (2013.01)
USPC ......................... 250/394; 250/395

(58) Field of Classification Search
USPC ....................... 250/366, 394, 395
See application file for complete search history.

(56) References Cited

U.S. PATENT DOCUMENTS

| | | | | |
|---|---|---|---|---|
| 2004/0251415 | A1* | 12/2004 | Verbinski et al. | 250/358.1 |
| 2006/0145079 | A1* | 7/2006 | Verbinski et al. | 250/358.1 |
| 2006/0145080 | A1* | 7/2006 | Verbinski et al. | 250/358.1 |

* cited by examiner

*Primary Examiner* — Mark R Gaworecki
(74) *Attorney, Agent, or Firm* — Lavanya Ratnam; William Washington (57) ABSTRACT

The invention provides a method for detecting a moving radiation source, the method comprising placing a plurality of radiation detectors at one or more locations; collecting information of counting rate as a function of time for each detector, computing the Fourier transform of the counting rate function for each detector and extracting from the computed Fourier transform the dynamic component of the detector response for each detector, and computing the convolution of the counting rate functions for combinations of detectors at different locations, then extracting therefrom information concerning the presence of radiation sources moving with respect to the radiation detectors.

15 Claims, 8 Drawing Sheets

METHOD AND DEVICE FOR DETECTING MOVING RADIATION SOURCES

FIELD OF THE INVENTION

The present invention relates to the detection of radiation and, more specifically, the present invention relates to a method and a system for the detection of discrete radioactive sources that are in motion relative to the detector position.

BACKGROUND OF THE INVENTION

Nuclear security applications often require differentiation of a threat source from ambient background noise.

Some nuclear security applications involve detecting and monitoring radiation sources which move relative to the detector. Examples include radiation portal monitors at sea ports and border crossings that screen cargo containers, vehicles, or pedestrians for radiological or nuclear materials and mobile radiation detectors deployed in search operations.

If separate measurements are made with and without the threat source being present, then the presence of the threat source can be differentiated by background subtraction. However, independent background measurements are not always practical or even possible in nuclear security scenarios. Moreover, if they are possible, the variance of the background measurement increases with the intensity of the background.

Efforts have been directed at either physically reducing the background or differentiating the response of a radiation detector to the background from that produced by a threat source. Physical reduction of the background can be accomplished by shielding or collimation of the detectors or by preparation of the site where the detectors are placed to remove radioactive materials contributing to the background. But while collimation reduces background noise, it also reduces both the solid angle from which the detectors can observe radiation and the time during which a moving source can be observed.

Previously, a number of approaches for differentiating the background from threat sources have been implemented, including spectroscopy (energy differentiation), imaging (angular differentiation), and localization (spatial differentiation).

In some nuclear applications, multiple detectors are present and observing the same moving source. The response of multiple detectors can be summed to achieve an improved sensitivity for detection of a threat source. In the case of identical detectors observing the same source in the same geometrical configuration, the ratio of the response to the threat source to the uncertainty in the background increases only as fast as the square root of the number of detectors. As such, summation of detector responses is perceived as having drawbacks.

Work by others has considered a time series evaluation of the detector response in order to identify the unique time profile of a radiation detector response to a moving point source.

A need exists in the art for a method and a system for the detection of radioactive sources that are in motion. This method should maximize the sensitivity of the detectors to the presence and the motion of the sources under consideration.

SUMMARY OF INVENTION

An object of the invention is to facilitate rapid and accurate identification of a moving target source that overcomes many of the drawbacks of the prior art.

Another object of the present invention is providing a system and a method for rapid and automatic identification of a moving source of radiation. A feature of the invention is separation of the dynamic and static components of the detector response by an analysis of the detector response in the frequency domain. An advantage of this invention is that it is not limited to point sources, or to sources moving with constant velocity.

Still another object of the present invention is to provide a system to detect and quantify moving radiation sources. A feature of the device is the use of a plurality of radiation detectors and to leverage the convolution of detector responses. An advantage of the invention is that responses to the moving source in the invented multiple detector paradigm are correlated with time.

Still another object of the present invention is to provide a method for differentiating detector responses to a moving radiation source from that of static background. A feature of the present invention is that the dynamic component of the detector response is extracted from the total response by extrapolation of the zero frequency coefficient of the Fourier transform which is based on the characteristic frequency spectrum produced by a moving source. The method of separating the dynamic component of the detector response is similar to that of applying an optimal filter but without the need for a separate measurement of the background. An advantage of the method is that it can be used when background subtraction is not possible due to lack of a separate background measurement.

Briefly, the invention provides a system for detecting a moving radiation source, the system comprising a means for detecting incoming radiation (such means being virtual detectors created from a single detector, or a plurality of actual detectors); instrumentation for collecting information of counting rate and/or pulse height spectrum as a function of time for each of the detectors; a means for determining the Fourier transform of the counting rate function for each detector and for extracting from the Fourier transform the velocity of the source and the ambient radiation background for each detector, and an algorithm for determining the convolution of the counting rate functions for combinations of (e.g. pairs of) detectors at different locations and extracting therefrom information concerning the presence, intensity, and position of the source. The invented method is not limited to pairs of detectors but rather multiples of detectors. The only requirement is that the detectors view the same moving object.

In an embodiment of the invention, a computational platform with which to apply the algorithm to separate the dynamic component of the detector responses is provided. This algorithm utilizes a computation of the Fourier transform of the individual detector responses (optionally the computation occurring automatically), multiplication of the Fourier transforms of individual detectors to form the convolution of multiple detectors (optionally the multiplication occurring automatically); and separation of the dynamic component of the convolution by application of an optimal filter (optionally the separation occurring automatically). When the measurement system provides a time dependent pulse height spectrum, this algorithm is applied to each pulse height channel. As such, the invented method and system is based on differentiating a moving source from the background by is unique signature as a time dependent phenomenon.

In an embodiment of the invention, the means for determining the Fourier transform of the counting rate function for each detector and for extracting the velocity of the source may include, but is not limited to a dedicated computer or other instrumentation. Hardware for use with the method and system can include a radiation detector such as a scintillation counter, Geiger counter, etc., scanning instrumentation for position determination, energy analysis instrumentation for identification of the source, and for time sequence instrumentation for counting so as to determine velocity. A salient feature of the method and system is that no collimators are utilized, inasmuch as collimators provide a limited field of view, whereas the invention enhances the field of view.

However the means could also include an imbedded application with the radiation detector electronics. For example, ASICs (Application Specific integrated circuits) are available for FFTs (Fast Fourier Transforms) and software applications.

Also provided is a method for detecting a moving radiation source, the method comprising placing a plurality of radiation detectors at one or more locations; collecting information of counting rate as a function of time for each of the detectors, computing the Fourier transform of the counting rate function for each detector and extracting from the computed Fourier transform the velocity of the source and the ambient radiation background for each detector, and computing the convolution of the counting rate functions for pairs of detectors at different locations, and extracting therefrom information concerning the presence, intensity, and position of the source.

Both the invented system and method reveals the presence and characteristic energy spectra of a threat source. From these data, determination of the intensity of the source can be derived.

BRIEF DESCRIPTION OF DRAWING

The invention together with the above and other objects and advantages will be best understood from the following detailed description of the preferred embodiment of the invention shown in the accompanying figures, wherein.

DETAILED DESCRIPTION OF THE INVENTION

The foregoing summary, as well as the following detailed description of certain embodiments of the present invention, will be better understood when read in conjunction with the appended drawings. As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention analyzes data from one or more detectors by means of their time convolution. Since it is computationally convenient to calculate the convolution of multiple detectors by means of the convolution theorem, and since the convolution of multiple detectors scales (i.e., increases) as the power of the number of detectors, detection analysis based on the convolution of detectors provide better sensitivity for detection of moving sources than methods based on the summation of detectors. The present invention combines the response of multiple detectors by their convolution. The magnitude of the convolution is seen to increase as the power of the number of detectors.

In an embodiment of the invention, only one detector or a plurality of detectors can be utilized to enable the invented system and method. So a means for obtaining independent measurements of incoming radiation can be a plurality of detectors; or just one actual detector which is split electronically into two or more virtual detectors. Such splitting occurs by splitting the time series into two or more parts.

Detection of a Moving Source with a Single Detector

For a single detector, the present invention is equivalent to an optimal filter, which produces a similar result to time series evaluations. The usefulness of the present invention is its extension to the convolution of multiple detectors.

Analysis of the counting rate of a single detector as a function time can yield information regarding motion of the source: counting rate increasing (decreasing) in time indicates motion towards (away from) the detector. The present invention analyzes the detector response in the frequency domain by computing the Fourier transform of the detector response, which afford the possibility of separating the dynamic and static component of the detector response by means of their unique signatures in the frequency domain.

Consider a source moving past a radiation detector. The total response in the detector as a function of time, t, is the sum of the response to the moving source and to the background $$c(t)=s(t)+b(t) \quad (1)$$

Where c(t) is the total response, s(t) the response to the moving source, and b(t) the response to the background. For illustrative purposes only, the source, background, and detector response are considered to be continuous functions of time. In an application of the method, the detector response is accumulated in discrete intervals of time. Therefore, where the term "Fourier transform" is used in the description of the method, the "discrete Fourier Transform" is used in the application of the method.

In principle, the background may have both dynamic and static components $$b(t)=b_{Dynamic}(t)+b_{Static}(t) \quad (2)$$

Where the static component, $b_{Static}(t)$, is defined as having a mean, $\mu_S$. The dynamic component of the detector response is defined as the sum of the dynamic component of the background and of the response to the moving source.

Detail of Fourier Transform of the Detector Response to the Static Component of the Background The Fourier transform of the static component of the background is $$B_{Static}(f) = \int_{-\infty}^{+\infty} b_{Static}(t)e^{-2i\pi tf} \, dt = \mu_B \delta(0) \tag{3}$$

Where $\delta(f)$ is the Dirac delta function as a function of frequency [i.e. here $\delta(f)=1$ if $f=0$ and $\delta(f)=0$ otherwise]. For real measurements of a background with constant mean, the discrete Fourier transform only approximates a delta function because of two factors. The first factor is that the background is measured over a finite time interval. The second factor is that discrete samples of a background with a constant mean exhibit a Poisson distributed variation.

Detail of Fourier Transform of the Detector Response to a Moving Source

For a point source moving with constant velocity, v, the mean count rate in the detector from the source varies inversely with the square of the distance between the source and detector if scattering and attenuation can be ignored:

$$s(t) = \frac{s(0)}{(vt)^2 + R^2} \tag{4}$$

Where $S_o$ is the source strength, t is the time variable and where R is the distance of closest approach of the source to the detector (at t=0). The Fourier transform of such a continuous source is $$S(f) = s(0) \int_{-\infty}^{+\infty} \frac{e^{2\pi itf}}{(vt)^2 + R^2} \, dt = s(0) \frac{\pi}{Rv} e^{\frac{-2\pi R|f|}{v}} \tag{5}$$

The derivative of the logarithm of the Fourier transform with respect to frequency is:

$$\frac{d\ln S(f)}{df} = \frac{2\pi R}{v} \tag{6}$$

Since the magnitude of the Fourier transform (or the convolution) of the detector response does not depend on the sign of the source, the direction of the source, that is, whether it is greater than or less than ambient background, is determined from the phase of the Fourier transform (or the convolution) of the detector response.

Thus, if the velocity of the source is known, one can estimate the offset distance to the source from the slope of the logarithm of S(f) vs. f plot. Or alternatively, if the offset distance is known, the velocity of the source can be estimated. While both velocity and offset distance can be measured more easily by other methods, the estimate of velocity, offset distance, or their ratio provides a means of validation of the estimate of the dynamic component of the detector response. The offset distance is the distance of closest approach of the source to the detector.

In an embodiment of the invented method, offset distance is determined when the geometry between the source and detectors is the same for all detectors, which is to say that all of the detectors see the source in the same way, such as what occurs when the detector are arranged in a linear array, as the radiation source passes by them. In instances where the source is itself rotating, then the detectors may be arranged so as to form an arc, a ring or tunnel through which the source moves.

Detail for Estimating the Dynamic Component of the Detector Response

Figure 1:
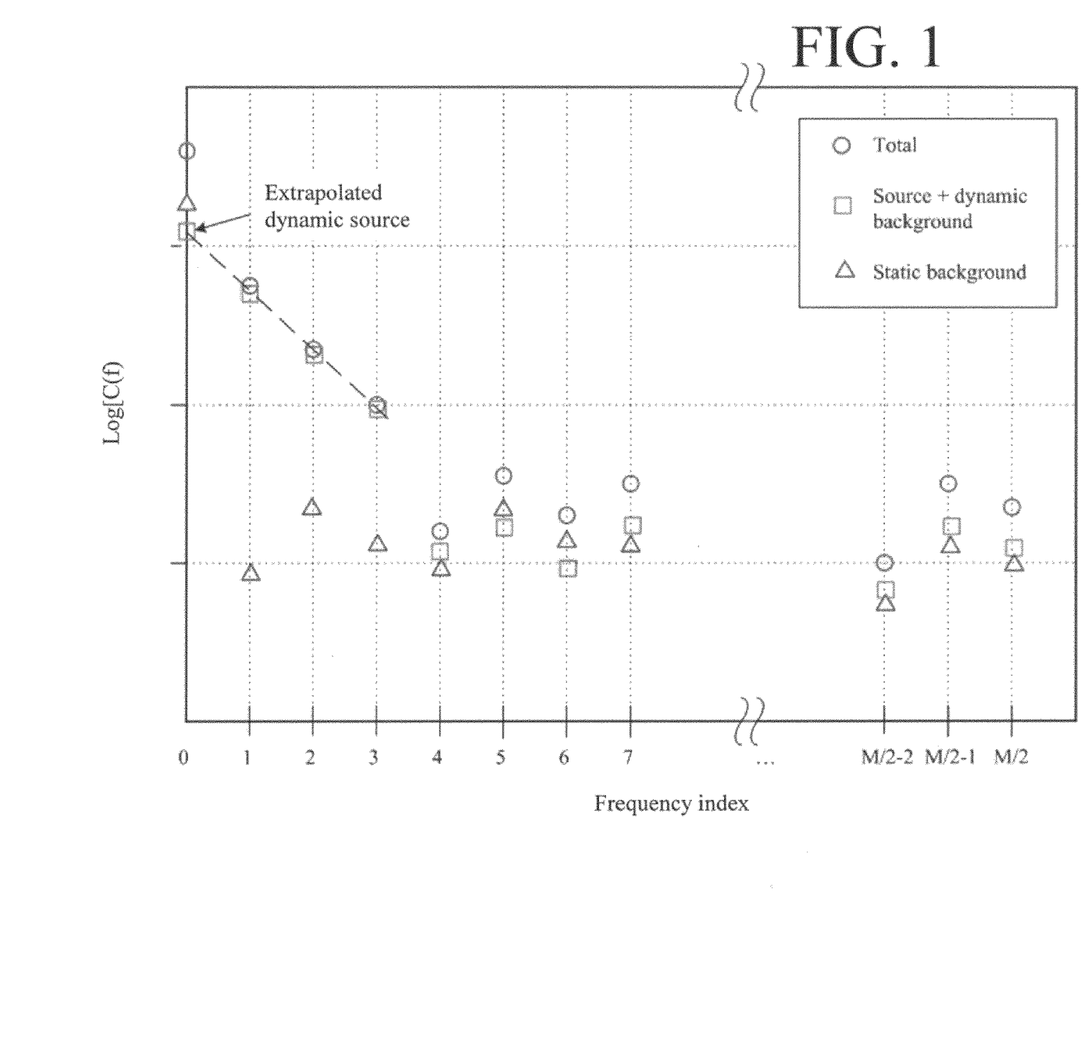
FIG. 1 illustrates the method of estimation of the dynamic component in the detector response, in accordance with features of the present invention.

FIG. 1 illustrates the method of estimation of the zero frequency coefficient of the dynamic component of the detector response from the first few coefficients of the Fourier transform of the detector response. Only the total response, designated by the circles, is measured. The detector response due to the moving source is estimated by extrapolation of higher frequency components of the Fourier transform of the detector response back to zero frequency.

As illustrated in FIG. 1, for a point source moving past a detector in the presence of a static background, the dynamic component of the detector response can be estimated by extrapolating back to zero frequency the non-zero frequency coefficients of the discrete Fourier transform of the detector response. From Equation 5, the zero frequency coefficient of the Fourier transform is the time integral of the dynamic component of the detector response. For a point source moving with constant velocity, this extrapolation would be linear on a logarithmic scale.

However, if the source is not moving with constant velocity as it passes the detector or if the source is not a point source but rather distributed over some volume, the logarithm of the magnitude of the discrete Fourier transform of the detector response is perturbed from the linear characteristic observed for a point source moving with constant velocity. By observing a number of variations of acceleration and volume distribution of a source in numerical simulations, a more robust estimate of the zero frequency coefficient of the dynamic component of the detector response can be estimated by a linear extrapolation of the logarithm of the first frequency coefficient with the average of the logarithms of the second and third coefficients.

Multiple Detectors Convolution Detail

If there are two detectors experiencing the same radiation environment with count rate distributions $c_1(t)$ and $c_2(t)$ respectively, then the convolution of the two detectors, denoted by $c_1*c_2$ is defined by Equation 7, to wit:

$$c_1 * c_2 = \int_{-\infty}^{+\infty} c_1(\tau)c_2(t-\tau) \, d\tau \tag{7}$$

The convolution $c_1*c_2$ is a function in the time domain is one member of the Fourier transform pair depicted in Equation 8, to wit:

$$c_1 * c_2 \Leftrightarrow C_1(f) \cdot C_2(f) \tag{8}$$

Where $C_1(f)$ and $C_2(f)$ are the corresponding Fourier transforms of $c_1(t)$ and $c_2(t)$. That is, the Fourier transform of the convolution is equal to the point by point product of the Fourier transforms of the two detector responses, this point by point product being automatically determined by instrumentation.

This can be extended to multiple detectors as $$C_N(f) = (((c_1 * c_2) * c_3) * \ldots ) * c_N \Leftrightarrow \prod_{i=1}^{t=N} C_i(f) \qquad (9)$$

Where N is the number of detectors.

If all of the detectors are identical, then it follows that $$C_N(f) = (((c_1 * c_2) * c_3) * \ldots ) * c_N \Leftrightarrow [C(f)]^N \qquad (10)$$

Thus the convolution of N identical detectors increases as the power of the number of detectors.

An embodiment of the invention utilizes a convolution of the detectors. The more colloquial expression "correlation of detectors" can also be applied to the invention since the correlation function is mathematically similar to the convolution function and differs only in that the addition of the integration variable in Equation 7 appears rather than the subtraction of the integration variable. The Fourier transform of the correlation of two detectors is the product of the Fourier transform of the first detector with the complex conjugate of the Fourier transform of the second detector. The embodiment of the invention utilizing the convolution of detectors avoids the additional step of taking the complex conjugate of the Fourier transform in order to combine the response of multiple detectors.

Gross Counts Measurements Detail

Figure 2A:
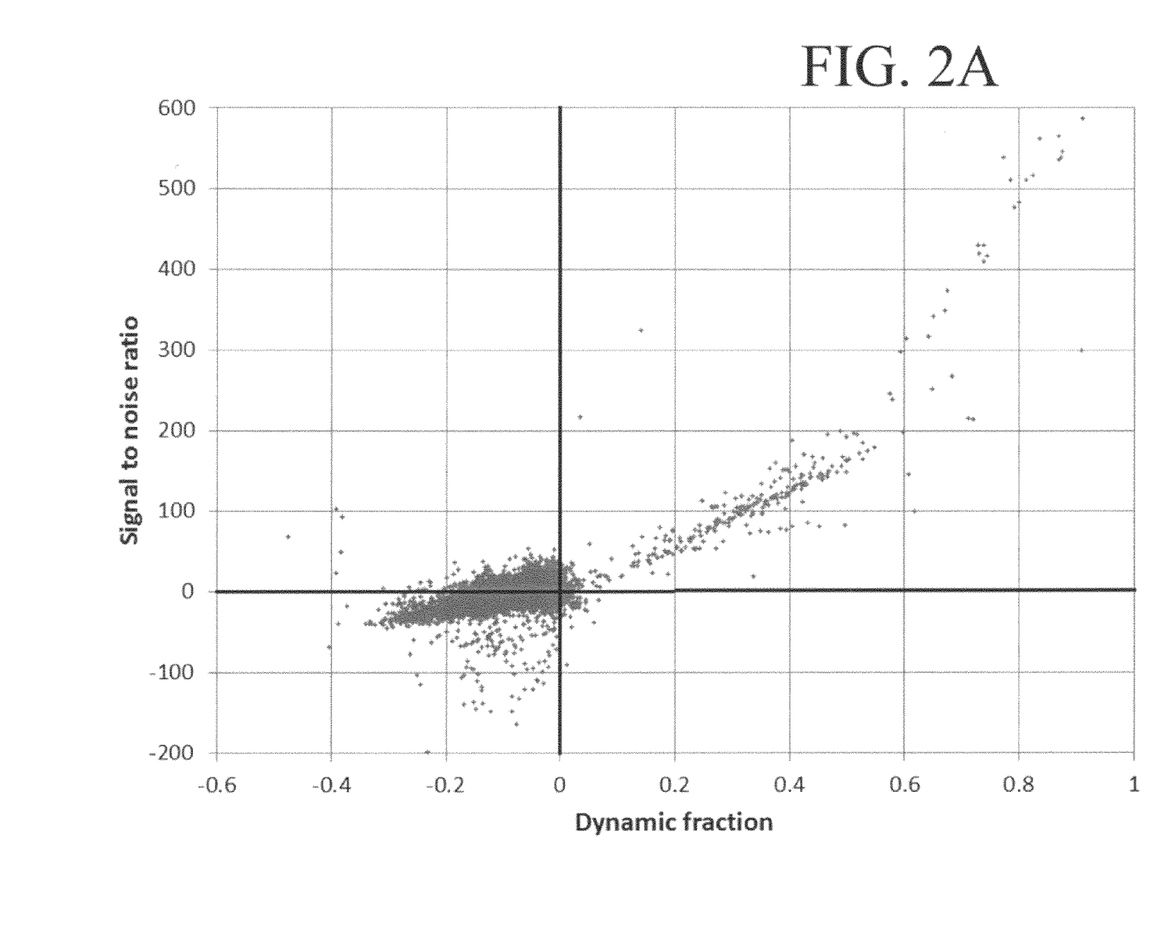
FIG. 2A illustrates, for a radiation portal monitor, a comparison of the dynamic (e.g. time dependent) component of the detector response to a measurement of the signal to noise ratio, in accordance with features of the present invention.
Figure 2B:
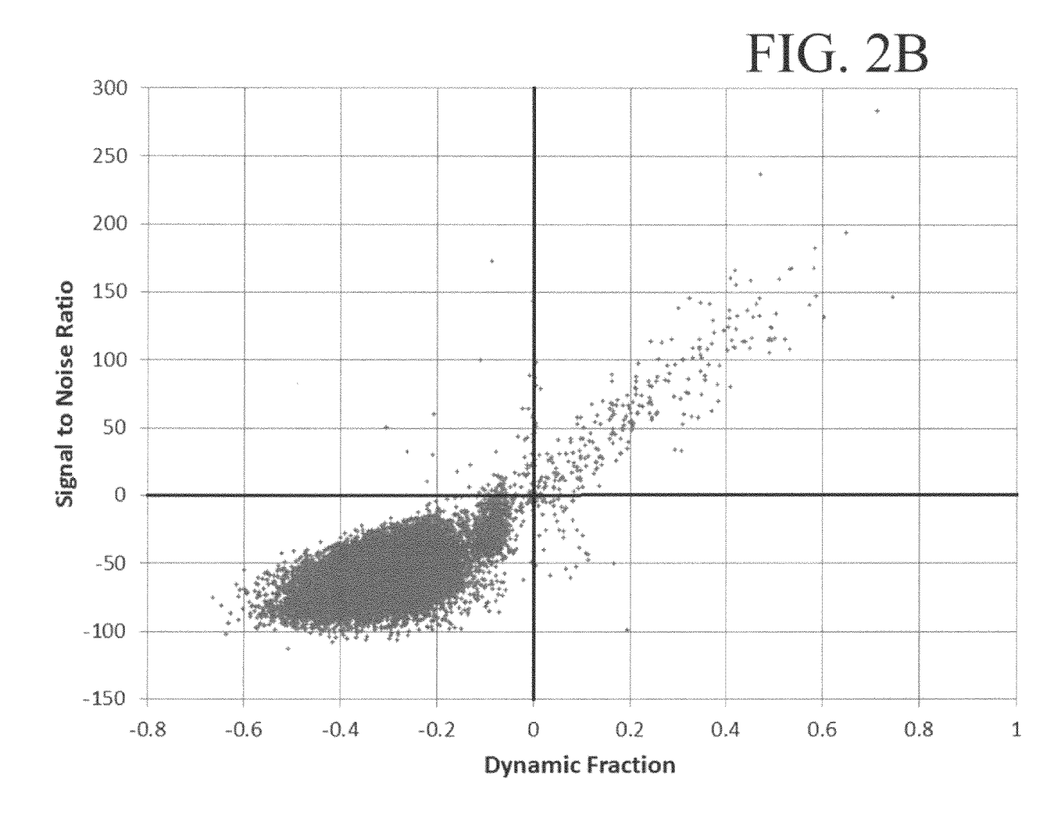
FIG. 2B illustrates, for a radiation portal monitor, a comparison of the dynamic (e.g. time dependent) component of the detector response to a measurement of the signal to noise ratio at a different location with an increased number of portal traverses, in accordance with features of the present

In order to test the possibility of detection of a moving source based on an estimate of the dynamic (e.g. time dependent) component of the detector response, radiation portal monitor data from two locations are evaluated and compared with the signal to noise ratio determined with an independent measurement of the preceding background. In an experimental embodiment of the invention, the radiation portal monitor contained four large polyvinyl toluene (PVT) detectors, two on each side of the portal. Each data point in the figures represents an individual traverse by an object or conveyance in the stream of commerce.

For each portal traverse, the discrete Fourier transform of the count rate distribution is calculated for the sum of the four detectors. The dynamic fraction of the total counts is then estimated by extrapolation of the coefficients of the Fourier transform at zero frequency according to the method described above and plotted against a calculation of the signal to noise ratio for each portal traverse. Note that the calculation of the dynamic fraction of the detector response does not utilize any independent measurement of the preceding background.

The signal to noise ratio is the ratio (difference between the sum of the counts in the four detectors during the traverse) divided by the square root of the preceding background integrated over the same time interval. The method for expressing radiation count rate in units of standard deviation is known. Specifically, details for expressing radiation count rate in units of the standard deviation of the background (i.e. the square root of the background) can be found in Radiation Detection and Measurement, (John Wiley & Sons, 2010) Chapter 3, Counting Statistics, incorporated herein by reference.

FIG. 2A and FIG. 2B display the dynamic fraction of detector response vs. signal to noise ratio for radiation portal monitors at two different locations. There were approximately 3,400 portal traverses in the first location (FIG. 2A) and approximately 16,000 traverses in the second location (FIG. 2B). Points in the lower left show background suppression produced by objects traversing the portals. Points in the upper right quadrant are indicators of a moving source. The dynamic fraction of the detector response is seen to be a monotonically increasing function of the signal to noise ratio. The point of this illustration is to show that an alarm algorithm for a radiation detector could be based on the measurement of the dynamic fraction of the detector response without requiring a separate measurement of the background.

Application to Spectral Measurements

The extraction of the dynamic component of a detector response is readily applied to spectral measurements (i.e. measurements where the pulse height of the detector signal is proportional to the energy of the radiation). Here the algorithm for extracting the dynamic component is applied to each pulse height bin.

Figure 3A:
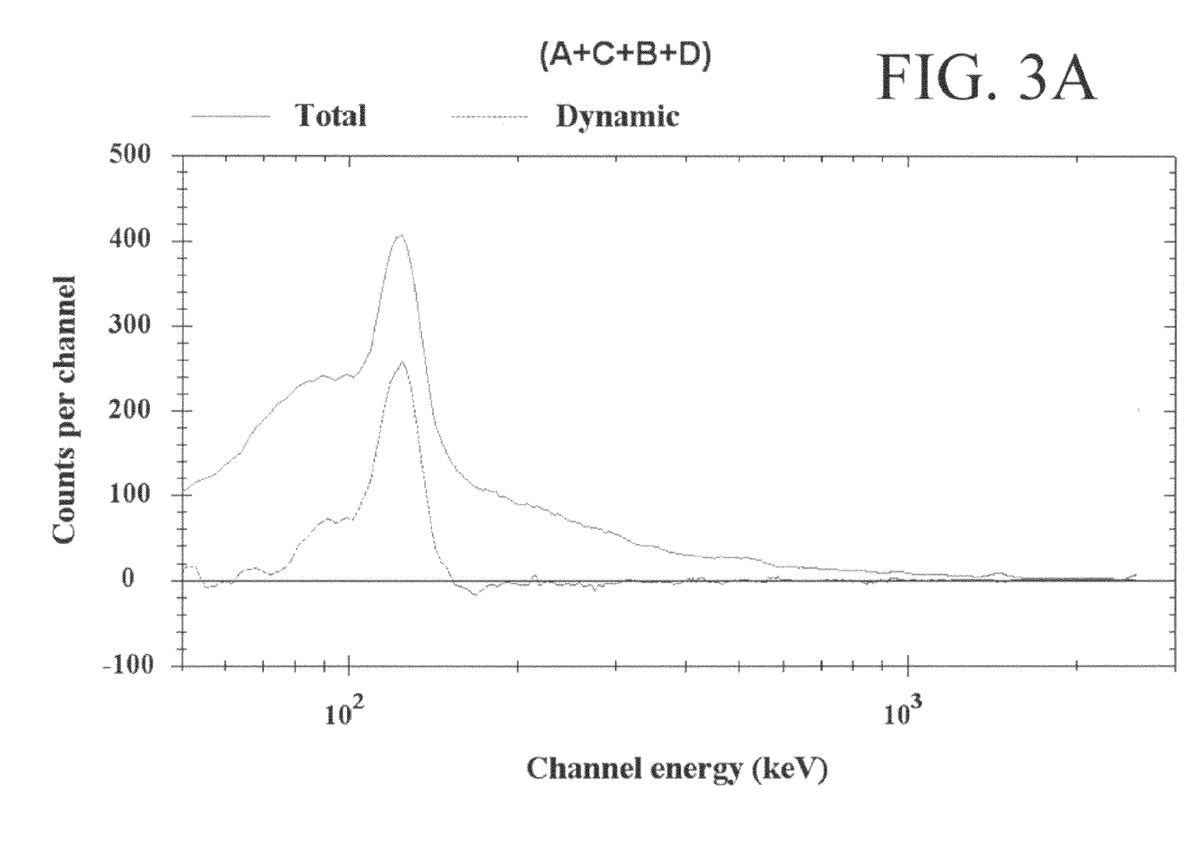
FIG. 3A depicts the total and dynamic components of the pulse height spectrum in the sum of four (4) 2"×4"×16" NaI detectors from a Co-57 source that passed by these detectors, in accordance with features of the present invention.
Figure 3B:
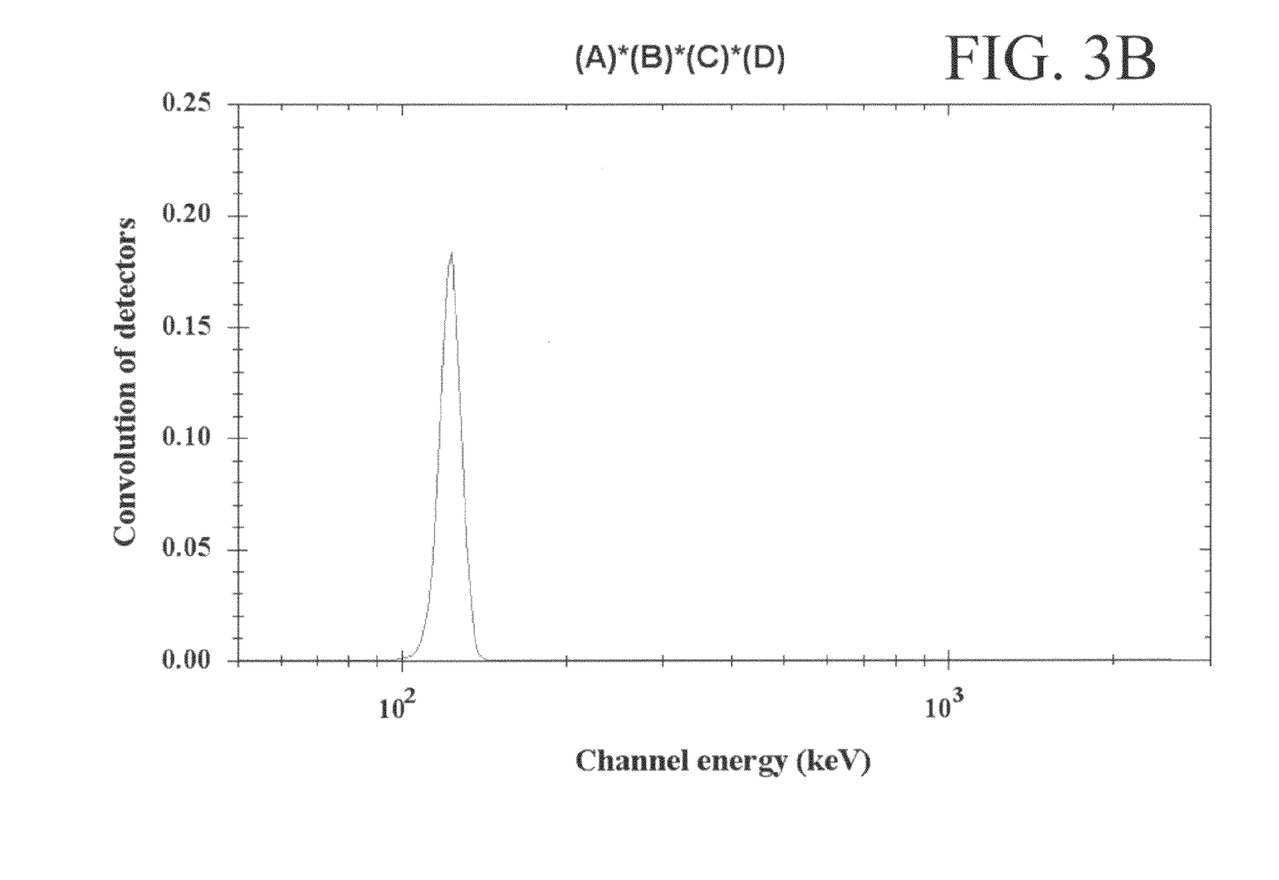
FIG. 3B depicts the convolution of the pulse height spectrum in the same four detectors featured in FIG. 3A, in accordance with features of the present invention.

FIGS. 3A and B show the total and dynamic components of the pulse height spectrum from a Co-57 source in a cargo container that passed by four 2"×4"×16" NaI detectors. FIG. 3A shows the total response and the dynamic component for the sum of the four detectors. Although the Co-57 peak at 122 keV is readily apparent in both the total and dynamic components of the detector response, the ratio of the counts in the peak to the spectral floor is increased by more than a factor of 10 in the extracted dynamic component (boxed in portion of curve) of the detector response. FIG. 3b shows the convolution of the 4 detectors in which the uncorrelated background is effectively removed. This enables the invented method to reveal the presence of a moving source by effectively eliminating the uncorrelated background.

Figure 4A:
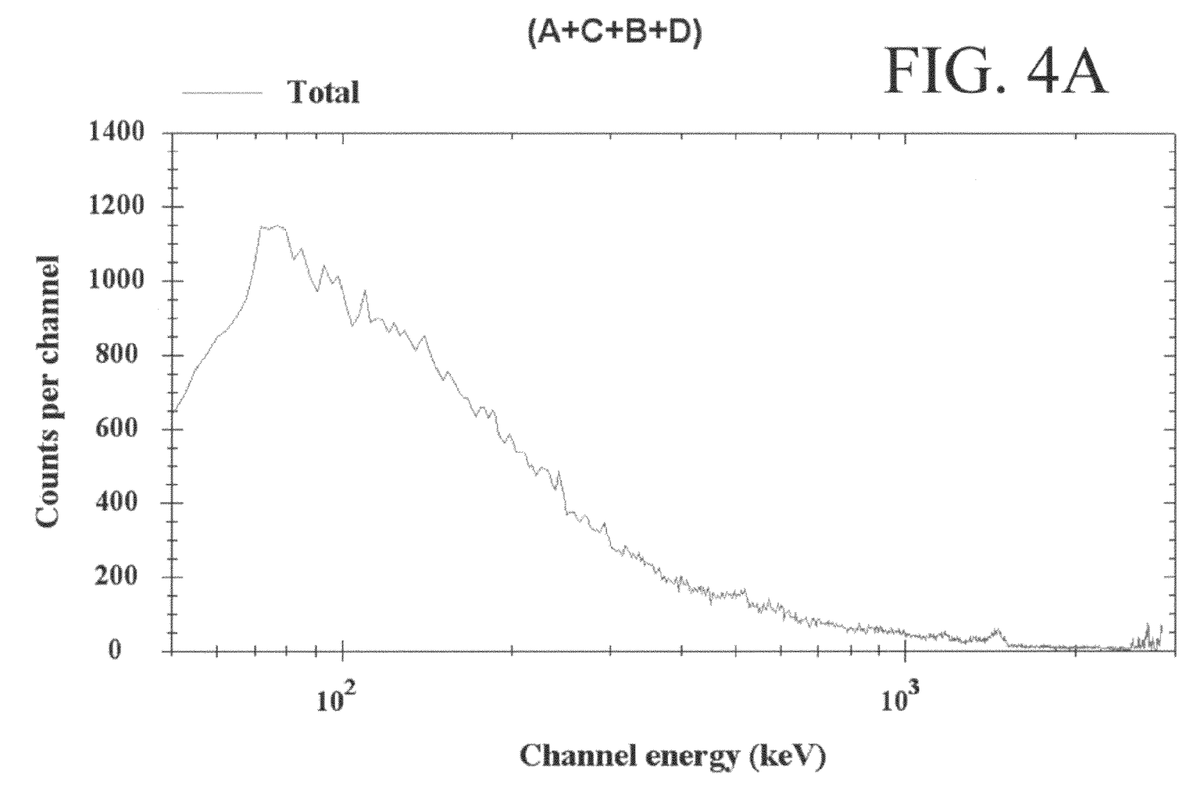
FIG. 4A depicts the total and dynamic components of the pulse height spectrum in the sum of four (4) NaI detectors from a Co-60 source that passed by the detectors, in accordance with features of the present invention.
Figure 4B:
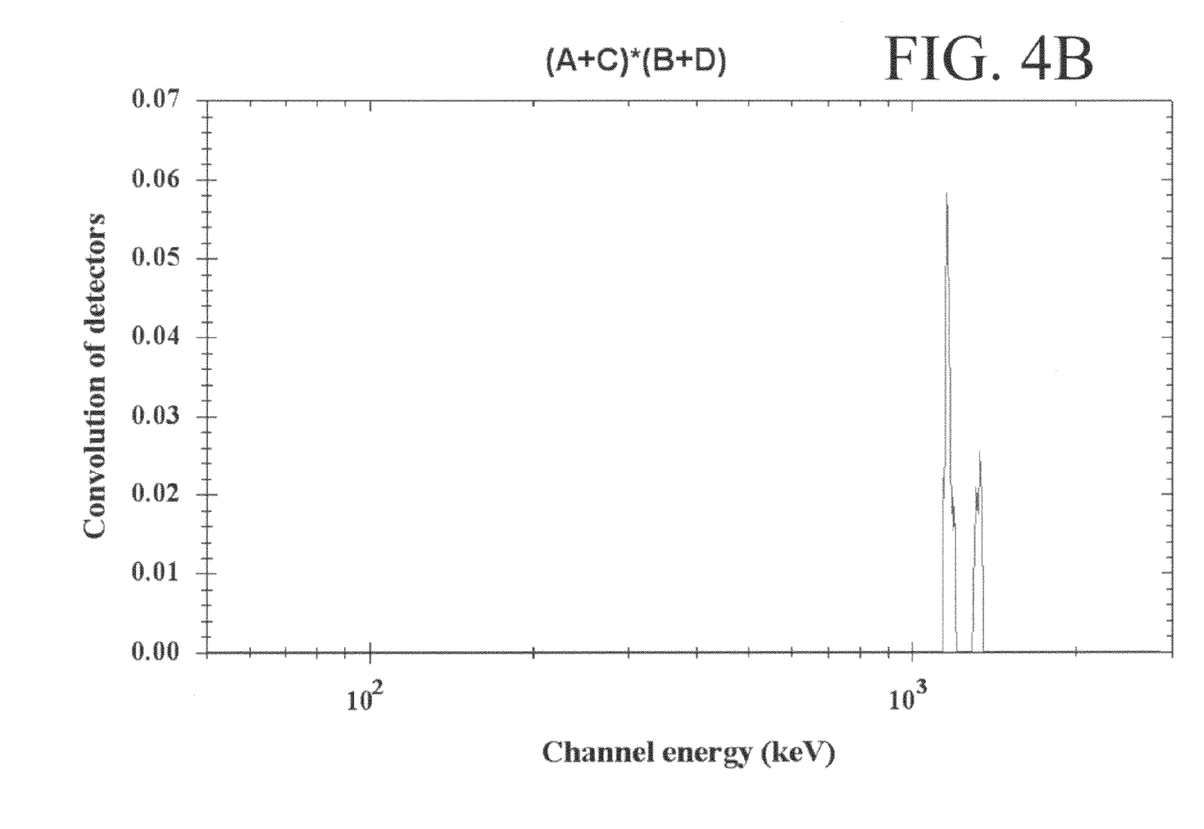
FIG. 4B shows the convolution of the pulse height spectrum in two pairs of the same four detectors disclosed in FIG. 4A.
Figure 4C:
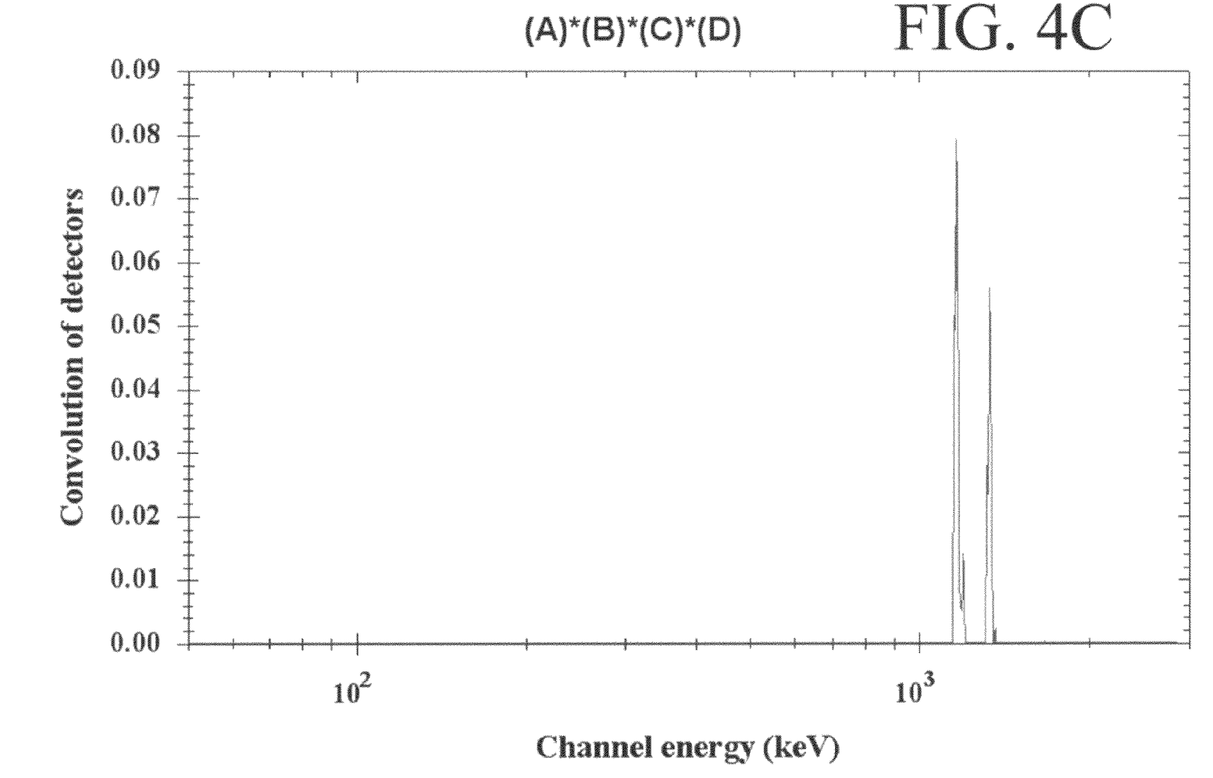
FIG. 4C shows the convolution of the pulse height spectrum in all four detectors disclosed in FIG. 4A.

FIGS. 4A, B, and C show similar results for a weak Co-60 source whose presence is not apparent in the background for the sum of four detectors (A, B, C, D). FIG. 4A shows the energy spectrum for the sum of four detectors. The presence of the Co-60 photopeaks at 1.12 and 1.3 MeV are not discernible. FIG. 4B shows the convolution of the sums of two pairs of detectors, and FIG. 4C shows the convolution of all four detectors. In both convolutions, the Co-60 photopeaks are detected.

It is to be understood that the above description is intended to be illustrative, and not restrictive. For example, the above-described embodiments (and/or aspects thereof) may be used in combination with each other.

In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for detecting a moving radiation source, the system comprising:
    a) a means for obtaining independent measurements of incoming radiation;
    b) instrumentation for collecting information of counting rate as a function of time for each of the detectors;
    c) a means for determining the Fourier transform of the counting rate function for each detector and extracting from the Fourier transform the velocity of the source and the ambient radiation background for each detector, and
    d) an algorithm for determining the convolution of the counting rate functions for combinations of detectors at different locations and extracting therefrom information concerning the presence of the source.

2. The system as recited in claim 1 wherein the radiation source is located in a region with no moving objects in front of or behind the radiation source.

3. The system as recited in claim 1 wherein the radiation source is located in a region with moving objects in front of or behind the radiation source.

4. The system as recited in claim 1 wherein the algorithm is used to calculate an offset distance from the detectors to the source.

5. The system as recited in claim 4 wherein the offset distance is used to calculate the velocity of the source.

6. The system as recited in claim 1 including a means for measuring the velocity of the source, so as to allow the algorithm to determine a distance of closest approach of the source to the detector.

7. A method for detecting a moving radiation source, the method comprising:
    a) placing a plurality of radiation detectors at one or more locations;
    b) collecting information of counting rate as a function of time for each of the detectors;
    c) computing the Fourier transform of the counting rate function for each detector and extracting from the computed Fourier transform the velocity of the source and the ambient radiation background for each detector; and
    d) computing the convolution of the counting rate functions for pairs of detectors at different locations, and extracting therefrom information concerning the presence of the source.

8. The method as recited in claim 7 wherein the radiation source is located in a region containing no moving objects except for the radiation source.

9. The method as recited in claim 7 wherein the radiation source is located in a region containing moving objects.

10. The method as recited in claim 9 wherein the moving objects are moving in different directions.

11. The method as recited in claim 9 wherein the moving objects are in front of, or to the side of, or in back of, the radiation source.

12. The method as recited in claim 7 wherein the method incorporates an independent measurement of the velocity of the so as to allow the algorithm to determine an offset distance to the radiation source.

13. The method as recited in claim 7 wherein the algorithm calculates an offset distance from the detectors to the source.

14. The method as recited in claim 13 wherein the offset distance is used to calculate the velocity of the radiation source.

15. The method as recited in claim 7 wherein the intensity of the source is determined when the geometry between the source and the detectors are the same.

* * * * *